United States Patent
Ramadas et al.

(10) Patent No.: US 6,836,353 B1
(45) Date of Patent: Dec. 28, 2004

(54) REDUNDANT SWITCH FABRIC METHODS AND SYSTEM FOR SWITCHING OF TELECOMMUNICATION SIGNALS

(75) Inventors: Krishna Kumar Ramadas, Cupertino, CA (US); Raj Jain, Saratoga, CA (US)

(73) Assignee: Nayna Networks, Inc., Milpitas, CA (US)

( * ) Notice: Subject to any disclaimer, the term of this patent is extended or adjusted under 35 U.S.C. 154(b) by 406 days.

(21) Appl. No.: 09/991,316

(22) Filed: Nov. 20, 2001

(51) Int. Cl.[7] .................. G02B 26/08; G02B 6/28; G02B 6/26; G02F 1/29; G02F 1/09
(52) U.S. Cl. .................. 359/298; 359/281; 385/18; 385/24
(58) Field of Search .................. 385/16, 17, 18, 385/19, 20, 21, 22, 23, 24; 359/290, 291, 298

(56) References Cited

U.S. PATENT DOCUMENTS

| | | |
|---|---|---|
| 4,317,611 A | 3/1982 | Petersen |
| 4,942,766 A | 7/1990 | Greenwood et al. |
| 5,488,862 A | 2/1996 | Neukermans et al. |
| 5,629,790 A | 5/1997 | Neukermans et al. |
| 5,648,618 A | 7/1997 | Neukermans et al. |
| 5,658,710 A | 8/1997 | Neukermans |
| 5,841,553 A | 11/1998 | Neukermans et al. |
| 5,861,549 A | 1/1999 | Neukermans et al. |
| 5,969,465 A | 10/1999 | Neukermans et al. |
| 6,044,705 A | 4/2000 | Neukermans et al. |
| 6,064,779 A | 5/2000 | Neukermans et al. |
| 6,447,291 B2 * | 9/2002 | Kim .............................. 433/4 |
| 6,606,427 B1 * | 8/2003 | Graves et al. ................ 385/17 |

FOREIGN PATENT DOCUMENTS

| | | |
|---|---|---|
| WO | PCT/US99/20218 | 3/2000 |
| WO | PCT/US99/21139 | 4/2000 |

OTHER PUBLICATIONS

U.S. Appl. No. 60/023,311.

* cited by examiner

*Primary Examiner*—Frank G. Font
*Assistant Examiner*—Patrick Connolly
(74) *Attorney, Agent, or Firm*—Townsend and Townsend and Crew

(57) ABSTRACT

An optical switching system and method. The method includes tapping a first portion of an incoming data beam from an incoming source; and transferring the incoming data beam from the incoming source to a first path provided by a first MEMS based switching fabric. The method also transfers a monitoring source to monitor a second path of provided by second MEMS based switch fabric, while the second path of the second MEMS based switch fabric is in a stand by mode. A step of tapping a second portion of an outgoing data beam provided by the first MEMS based switching fabric is also included. The method determines if a process condition of the first path by at least the second portion of the outgoing data beam.

15 Claims, 10 Drawing Sheets

REDUNDANT SWITCH FABRIC METHODS AND SYSTEM FOR SWITCHING OF TELECOMMUNICATION SIGNALS

BACKGROUND OF THE INVENTION

This present invention generally relates to techniques for telecommunications. More particularly, the present invention provides a method and system for switching optical signals using a redundant switch fabric system and method for long haul communications. Merely by way of example, the invention is applied to a MEMS based switching system over a wide area network for long haul communications. But it would be recognized that the invention could also be applied to other types of switching such as wave-guides, electro-optic devices, holographic switches, bubble switches, liquid crystal switches, and many others for applications including metropolitan, access, and other networks.

Over the past years, digital telephone has progressed with a desire for faster communication networks. In general, conventional analog voice telephone signals have been converted into digital signals. These signals can have transmission rates of 64,000 bits/second and greater in some applications. Other telephone circuits interleave these bit streams from 24 digitized phone lines into a single sequence of 1.5 Mbit/second, commonly called the T1 or DS1 rate. The T1 rate feeds into higher rates such as T2 and T3. A T4 may also be used. Single mode fiber optics has also been used at much higher speeds of data transfer. Here, optical switching networks have also been improved. An example of such optical switching standard is called the Synchronous Optical Network (SONET), which is a switching standard designed for telecommunications to use transmission capacity more efficiently than the conventional digital telephone hierarchy, which was noted above. SONET organizes data into 810-byte "frames" that include data on signal routing and designation as well as the signal itself. The frames can be switched individually without breaking the signal up into its components, but still require conventional switching devices.

Most of the conventional switching devices often require the need to convert optical signals from a first source into electric signals for switching such optical signals over a communication network. Once the electric signals have been switched, they are converted back into optical signals for transmission over the network. As merely an example, a product called the SN 16000, BroadLeaf™ Network Operating System (NOS), made by Sycamore Networks, Inc. uses such electrical switching technique. Other systems have been developed by Lucent Technologies, Inc., Ciena Corporation, and other companies. Numerous limitations exist with such conventional electrical switching technique. For example, such electrical switching often requires a lot of complex electronic devices, which make the device difficult to scale. Additionally, such electronic devices become prone to failure, thereby influencing reliability of the network. The switch is also slow and is only as fast as the electrical devices. Accordingly, techniques for switching optical signals using a purely optical technology have been proposed. Such technology can use a wave guide approach for switching optical signals. Unfortunately, such technology has been difficult to scale and to build commercial devices.

Other companies have also been attempting to develop technologies for switching a high number of signals in other ways such as high density mirror arrays, but have been generally unsuccessful. A major obstacle for such high-density mirror arrays is that such high density switches cannot be scaled up or down for switching a greater quantity of signals or fewer signals. That is, an eight-by-eight optical switch cannot easily be scaled up to larger switch designs. Larger switch designs also cannot be scaled down in size. Accordingly, such attempts have generally been unsuccessful to provide a flexible method and system for conventional telecommunication applications.

From the above, it is seen that an improved way of switching signals is highly desirable.

SUMMARY OF THE INVENTION

According to the present invention, techniques including methods and systems for optical switching are provided. More particularly, the present invention provides a method and system for switching optical signals using a redundant switch fabric system and method for long haul communications. Merely by way of example, the invention is applied to a MEMS based switching system over a wide area network for long haul communications. But it would be recognized that the invention could also be applied to other types of switching such as wave-guides, electro-optic devices, holographic switches, bubble switches, liquid crystal switches, and many others for applications including metropolitan, access, and other networks.

In a specific embodiment, the invention provides an optical switching system. The system has a housing; and an input device coupled to the housing. An output device is also coupled to the housing. A first switch fabric is coupled between the input device and coupled between the output device. The first switch fabric comprises a plurality of MEMS based switching devices. A second switch fabric is coupled between the input device and coupled between the output device. The second switch fabric comprises a plurality of MEMS based switching devices. An input fiber bundle is coupled to the input device and an output fiber bundle is coupled to the output device. A first switching device is coupled to the first switch fabric and is coupled to the second switch fabric. The first switching device also is coupled to the input device for receiving a beam from one of the input fibers and directing the beam to the first switch fabric or the second switch fabric depending upon predetermined criterion. A second switch device is coupled to the first switch fabric and is coupled to the second switch fabric. The second switching device also is coupled to the output device for receiving the beam from either the first switch fabric or the second switch fabric depending upon the predetermined criterion. A control device is coupled to the first switch device and the second switch device. The control device provides a signal to determine if the beam is to be directed to the first switch fabric or the second switch fabric based upon the predetermined criterion.

In an alternative specific embodiment, the invention provides an optical switching method. The method includes tapping a first portion of an incoming data beam from an incoming source; and transferring the incoming data beam from the incoming source to a first path provided by a first MEMS based switching fabric. The method also transfers a monitoring source to monitor a second path of provided by second MEMS based switch fabric, while the second path of the second MEMS based switch fabric is in a stand by mode. A step of tapping a second portion of an outgoing data beam provided by the first MEMS based switching fabric is also included. The method determines if a process condition of the first path by at least the second portion of the outgoing data beam.

Many benefits are achieved by way of the present invention over conventional techniques. In a specific embodiment, the invention provides a redundant system using conventional hardware and/or software. The invention also provides a switch system, which can be maintained easily. The invention can be used to switch optical signals without conversion into electrical signals in some embodiments. In some embodiments, the invention can be used to replace a cross connect device with another, while the system is still under power without damage to software and/or hardware elements. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 4A through 4H are more detailed diagrams of elements in the system according to embodiments of the present invention;

DESCRIPTION OF THE SPECIFIC EMBODIMENTS

According to the present invention, techniques including methods and systems for optical switching are provided. More particularly, the present invention provides a method and system for switching optical signals using a redundant switch fabric system and method for long haul communications. Merely by way of example, the invention is applied to a MEMS based switching system over a wide area network for long haul communications. But it would be recognized that the invention could also be applied to other types of switching such as wave-guides, electro-optic devices, holographic switches, bubble switches, liquid crystal switches, and many others for applications including metropolitan, access, and other networks.

Figure 1:
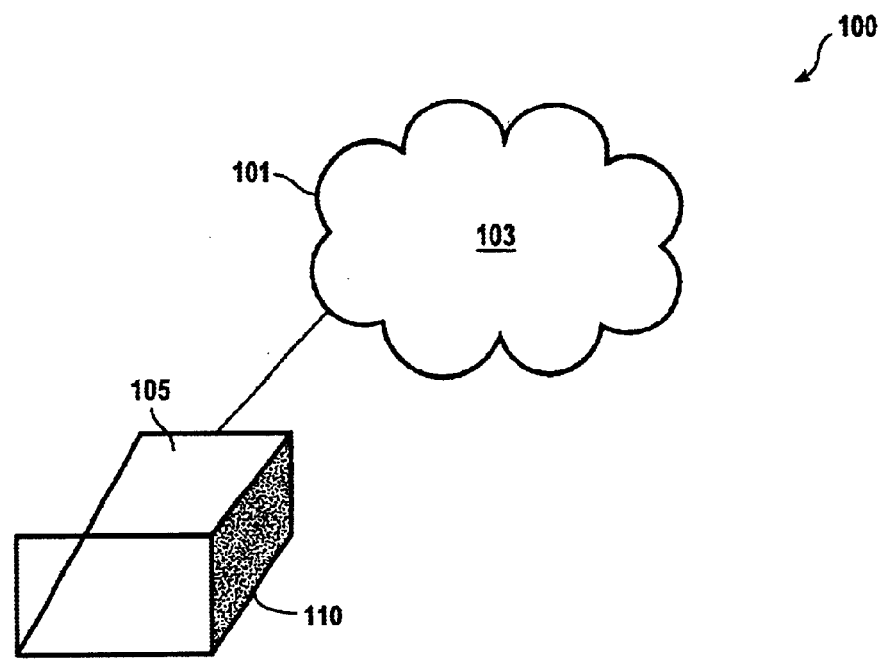
FIG. 1 is simplified diagram of an optical switching network according to an embodiment of the present invention.

FIG. 1 is simplified diagram 100 of an optical switching network according to an embodiment of the present invention. This diagram is merely an example, which should not unduly limit the scope of the claims herein. One of ordinary skill in the art would recognize many other variations, modifications, and alternatives. As shown, the diagram illustrates an optical network system 100 including a plurality of SONET rings or the like, which are shown by a cloud 101 configuration. Each of the SONET rings is coupled to one or more network switching systems 103, 105, which are coupled to each other. The network switching systems can be coupled to long haul optical network system. In a specific embodiment, each of the systems switches an optical signal from one of the rings to another one of the rings, where the transmission path is substantially optical in path. That is, the signal is not converted into an electrical signal via an optoelectronic device, which is coupled to an electrical switch that switches the signal. In the present embodiment, the transmission path is substantially optical. Further details of the switching system are provided below.

Figure 1A:
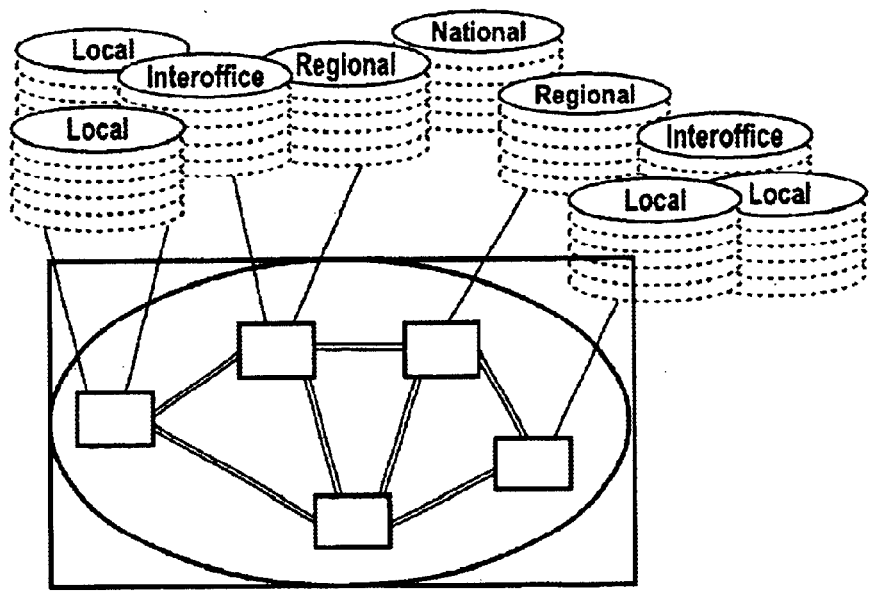
FIGS. 1A, 1B, and 1C are simplified diagrams of the present system in alternative deployment embodiments.

In a specific embodiment, the invention provides a system for bypassing traffic from the SONET networks, which can be congested, onto optical networks, as shown in FIG. 1A. The traffic from the congested SONET rings from regional, national, local, interoffice, and others will be tapped off and transported across the country to the destination. The switches can be deployed at major hubs to add, drop, and transport traffic through the network. Shown below are typical examples of how the present switches may be configured to relieve the SONET traffic.

Figure 1B:
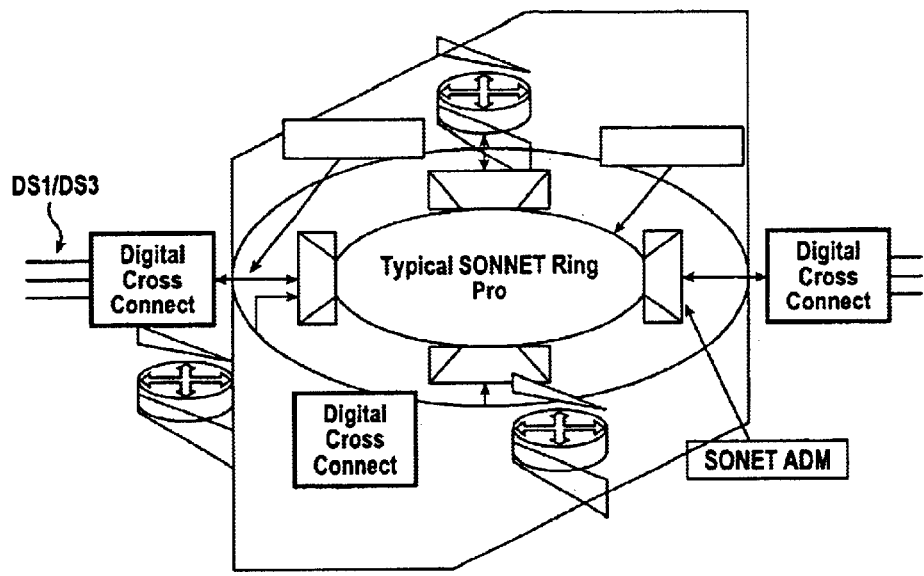
Figure 1C:
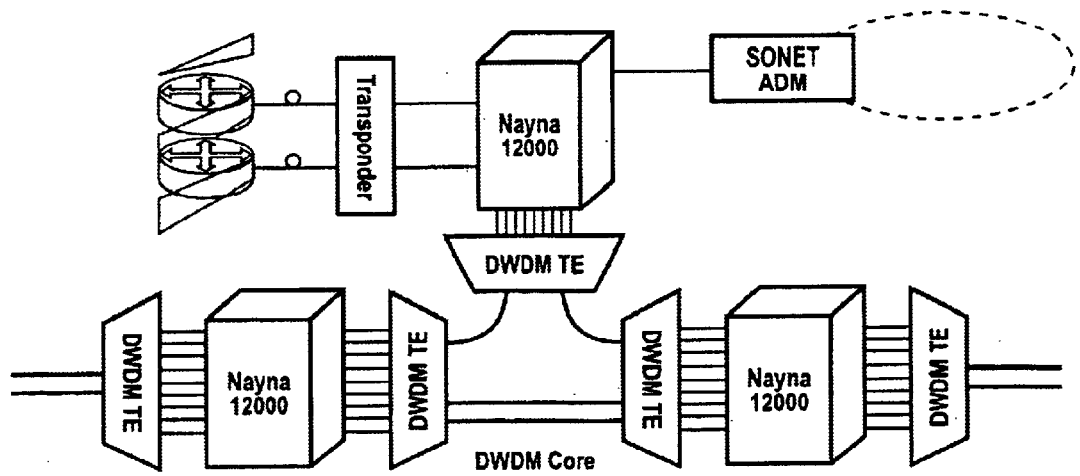

At least two reference models have been provided for the deployment of optical switches. In a preferred embodiment, the present system supports each of the models based on customer needs. FIG. 1B shows a simplified physical implementation of the SONET node and how the present switch system connects to it. (Not shown are the DWDM transport termination boxes, which feed the de-multiplexed signals to the present systems). Alternatively, the present system can be coupled to nodes with DWDM terminating equipment, as shown in FIG. 1C. The system supports connection from remote and collocated routers through DWDM interfaces. For local router control it is often desirable to use a transponder to map wavelengths to a telephone network grid.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. The present system can also be deployed in other configurations, as well. It is also understood that the examples and embodiments described herein are for illustrative purposes only and that various modifications or changes in light thereof will be suggested to persons skilled in the art and are to be included within the spirit and purview of this application and scope of the appended claims.

Figure 2:
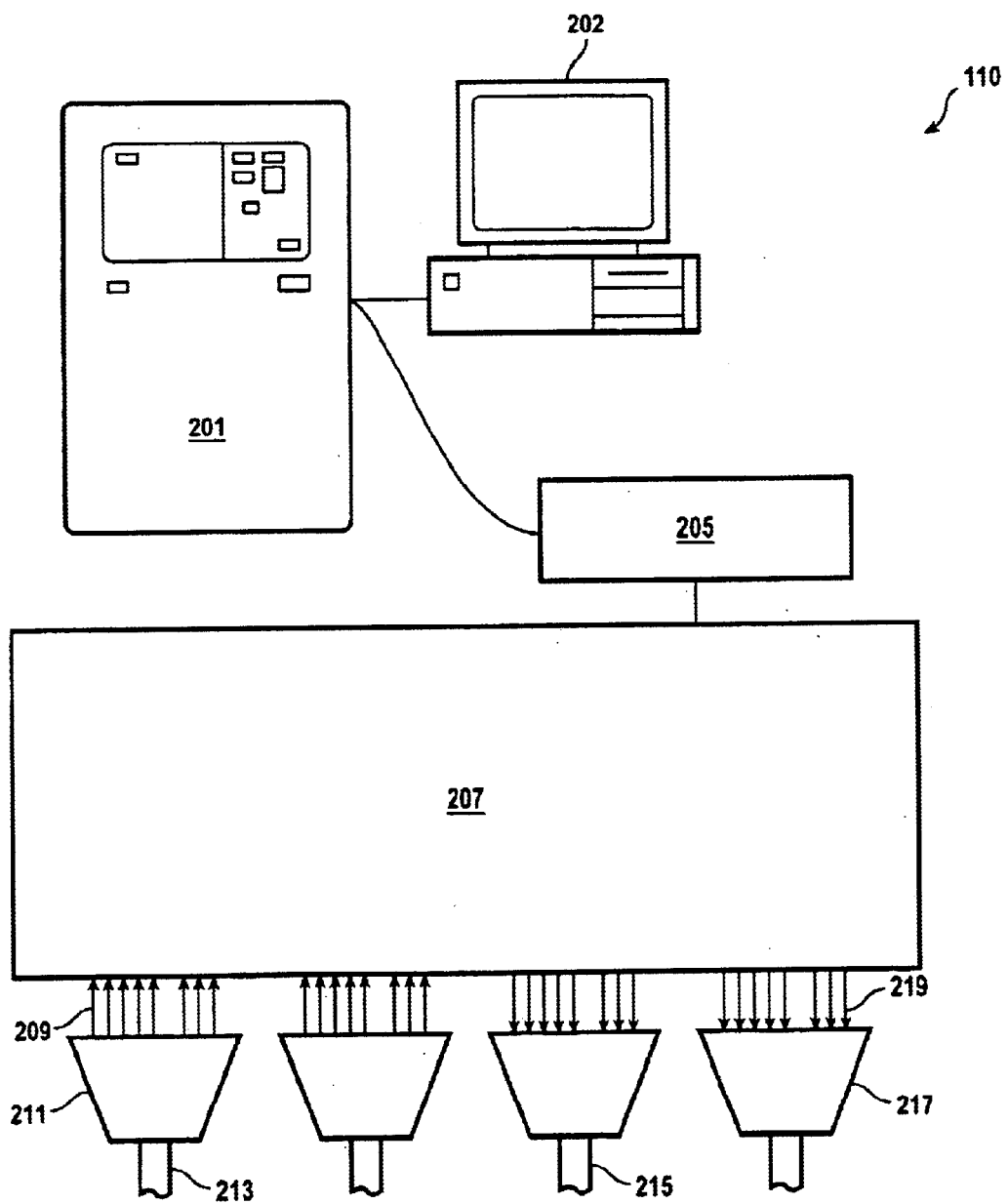
FIG. 2 is a detailed diagram of an optical switching system according to an embodiment of the present invention.

FIG. 2 is a detailed diagram of an optical switching system 200 according to an embodiment of the present invention. This diagram is merely an example, which should not unduly limit the scope of the claims herein. One of ordinary skill in the art would recognize many other variations, modifications, and alternatives. As shown, the switching system 10 includes a variety of features such as a switching apparatus 207, which includes redundant switching fabrics. Apparatus 207 couples to incoming fiber bundles 213 through multiplexer/demultiplexer devices 211. In a preferred embodiment, the multiplexer/demultiplexer devices are DWDM devices, which receive signals from incoming fiber bundle 213 and separate such signals into channels 209, each representing a wavelength or the like. Apparatus 207 also couples to outgoing fiber bundles 215 through multiplexer/demultiplexer devices 217. In a preferred embodiment, the multiplexer/demultiplexer devices are DWDM devices, which receive channels representing wavelengths 219 from the apparatus and output such channels as outgoing optical signals.

A communication control device 205 couples to the apparatus. Such control device is overseen by a computing device 201, which includes a display. The computing device can be any suitable microprocessor based device. The computing device couples to display 202. Depending upon the embodiment, a variety of software processes can be incorporated into the computing device, which have been described throughout the present specification and more particularly below. Additionally, further details of the apparatus are also provided throughout the present specification and more particularly below.

Figure 3:
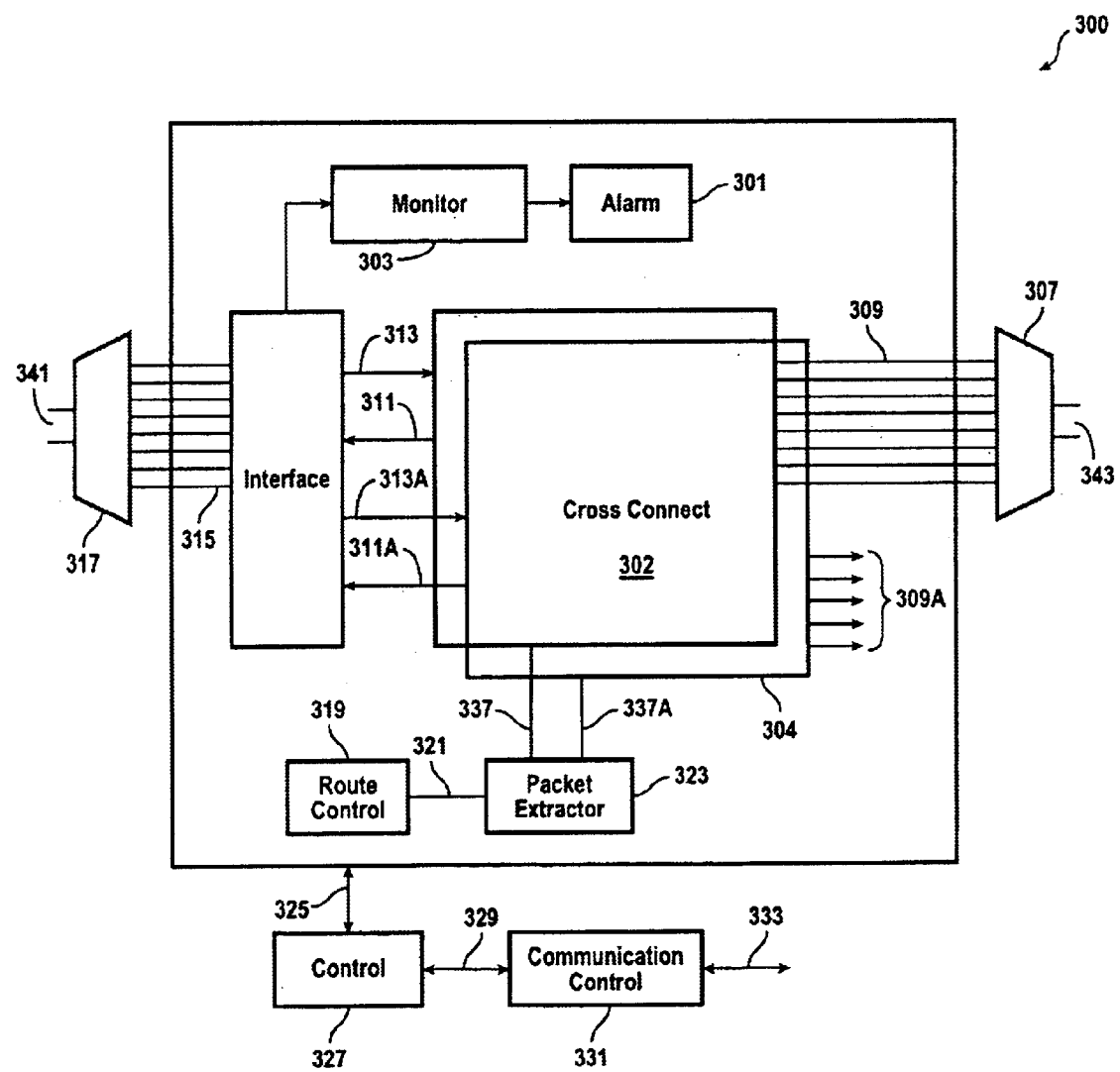
FIG. 3 is a more detailed diagram of an optical switching system including a redundant switch fabric according to an embodiment of the present invention.

FIG. 3 is a more detailed diagram of an optical switching system 300 according to an embodiment of the present invention. This diagram is merely an example, which should not unduly limit the scope of the claims herein. One of ordinary skill in the art would recognize many other variations, modifications, and alternatives. As shown, the system has a variety of elements including fiber interfaces, 305, which couple to cross-connect 302 and redundant cross connect 304. Fiber interfaces 305 couple to multiplexers/demultiplexers, DWDM devices, 317, 307. Device 317 has input fiber bundle 341 and output fibers 315, which are numbered from 1 to n, representing integers for example. Device 307 has output fiber bundle 343 and output fibers 309, which are numbered from 1 to n. The data path through the interface devices and cross-connect correspond to light paths through the fiber interfaces, and the switching matrices. In a specific embodiment, the paths are switched at configuration through user control or dynamically through multi-protocol latched switching (GMPLS) signaling messages. In preferred embodiments, generally all data paths through the system have redundant configurations to support high system availability and avoid single points of failure. Other elements include a performance monitoring module 303 coupled to the interface and an alarm 301 coupled to the module. Additionally, the system includes a packet extractor 323 coupled to the cross-connect 302 via line 337. A route control 319 is coupled to the packet extractor via line 321. Overseeing and controlling the system is control 327 coupled via line 325. Communication control 331 is coupled to control via line 329. The communication control 331 couples to network management modules via network interface 333. For redundant switch fabric 304, similar elements such as interface 313A, 311A to interface 305 are included. Additionally, the redundant switch fabric includes communication line 337A to packet extractor and also includes output fibers 309A. Further details of networking and other interface devices are provided below.

Figure 4:
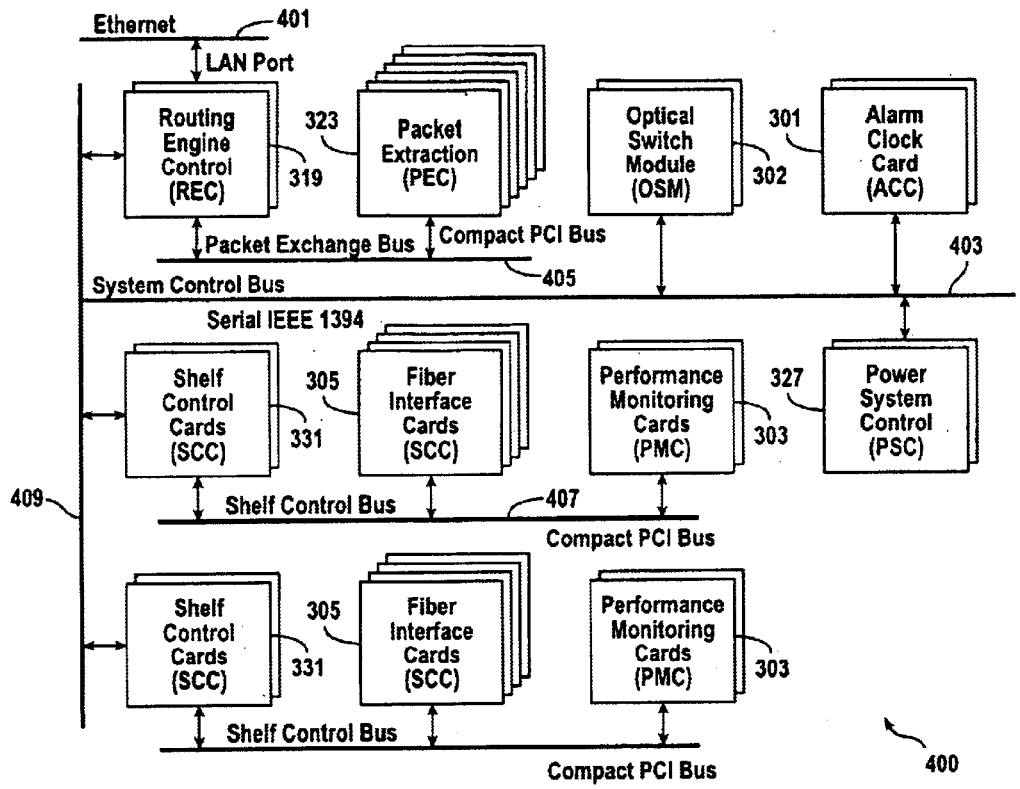
FIG. 4 is a more detailed block diagram of an optical switching system according to an alternative embodiment of the present invention.

FIG. 4 is a more detailed block diagram 400 of an optical switching system according to an alternative embodiment of the present invention. This diagram is merely an example, which should not unduly limit the scope of the claims herein. One of ordinary skill in the art would recognize many other variations, modifications, and alternatives. Like reference numerals are used in this Fig. as the previous Fig. for cross-referencing purposes only. As shown, the system includes interface devices, such as a local area network 401, which couples to the routing engine control 319. The system also includes a common system control bus 403, which couples to optical switch module 302 and alarm clock card 301. The control bus also couples to power system control 327. The system control bus also couples to shelf control card, which couples to fiber interface card 305 and couples to performance monitoring card 303 through shelf control bus 407. The system control bus 409 couples to shelf control card, which also couples to fiber interface card 305 and performance monitoring card 303 through shelf control bus. The fiber interface card couples to the switch fabric.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. Further details of each of the elements in this diagram are provided throughout the specification and more particularly below.

FIGS. 4A through 4H are more detailed diagrams of elements in the system according to embodiments of the present invention. These diagrams are merely examples, which should not unduly limit the scope of the claims herein. Each of the elements can be implemented using a combination of hardware and/or software. Such elements include: Routing Engine Card; Shelf Control Cards; Fiber Interface Cards; Switch Fabric; Packet Extraction Cards; Performance Monitoring card; Back plane; Alarm Clock Card; and Power Supply System. All of the above elements are preferably field replaceable. Additionally, the term "card" is not intended to describe any physical device but is merely used for illustrative purposes. A brief description of the elements is presented below.

Routing Engine Card

Referring to FIG. 4A, the system includes a Routing Engine Control (REC) card, which is the main system controller in a specific embodiment. The REC card manages configuration of the system, interfaces and oversees most if not all element management systems, processes IP control messages, and administers control and data buses in the system. REC cards are installed in a 1+1 redundant configuration with mastership logic used to determine the active and standby states of the switches. Functions of the REC are to provide the control interface, manage the system resources, and process IP control messages to and from a Packet Extraction Card (PEC), which will be described in more detail below.

In a specific embodiment, the REC includes a control processor 402, control bus communication 413, packet interchange bus 412, mastership control 404, and memory systems 405, 406. The control processor can be any suitable micro processing device such as an Intel Pentium based controller manufactured by Intel Corporation of Santa Clara, Calif., which includes boot logic and reset logic 403, a clock oscillator, LED indicators, and other features. As shown, the REC card includes a system control bus interface 410, which can be a high-speed serial 1394 bus or any other suitable device such as Switched Fast Ethernet bus. The control bus interfaces to the shelf controllers, the optical switch matrix, alarm control, and the power system control for configuration, monitoring, and administration functions.

As shown, the REC has a serial port 408 to support a Crafts interface. The serial port can be any suitable port such as an RS232 port that is auto-sensing for port speed. The REC also has a plurality of local area networking (i.e., Ethernet) ports 409 to support LAN access. Such LAN ports interface to network management and additional future network elements. A packet interchange bus 411 communicates between the PEC and the REC. The package interchange bus is based on the compact PCI bus architecture. The PCI common bus will be for configuration and management in addition to supporting configuration and management. The REC card includes support storage of selected system and network configuration to hard-disk media, which is a local disk system 407 located on the REC. In a specific embodiment, the present system allows the REC to process up to 25,000 messages per second and greater.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like.

Shelf Control Card

Figure 4B:
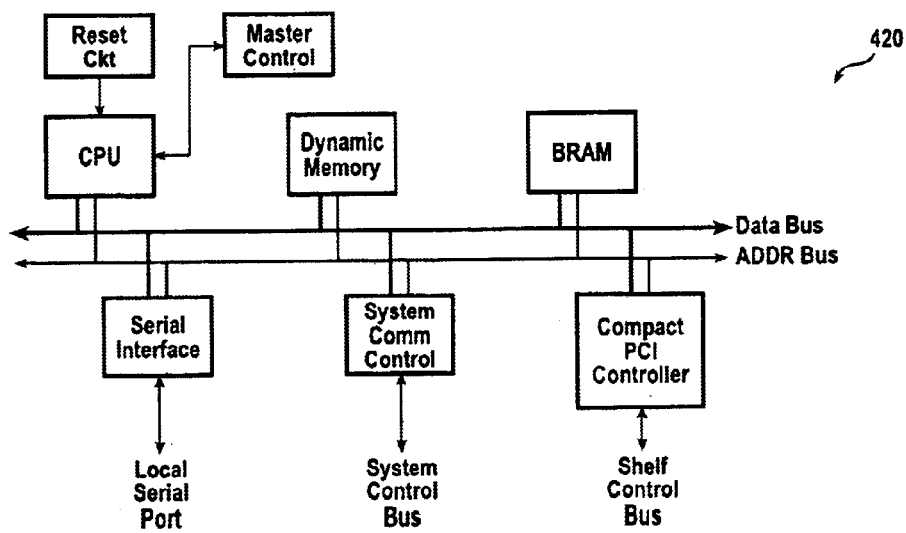

Referring to FIG. 4B, a shelf control card 420 is illustrated. The shelf control card controls configuration and management of the Fiber Interface Cards (FICs) and Performance Monitoring Cards (PMCs), which are described in more detail below. The shelf control card also communicates with the system controller for overall system control functions. The card is based upon a suitable processor such as an Intel-based processor designs, but can be others. Preferably, the cards support communication paths through the system. Each of these cards is installed in redundant or non-redundant configuration on a per shelf basis. 1+1 redundancy is the configuration of choice for the system.

In a specific embodiment, the control card 420 is composed of elements that support the general processing environment. The card has a processor 421, memory 424, 425, boot code and reset circuitry 422, and master control 423. Additionally, master control 423 determines which card is the active and standby controllers. The shelf controllers communicate through Compact PCI bus 428 to the FICs and the PMCs. The PCI bus is designed in a master/slave architecture to provide efficient communication. Each shelf card will be memory mapped to allow information to be exchanged between the system communication control (SCC) 427 and other cards installed on the shelf. The shelf card also has serial interface 426, which can be a local serial port.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like.

Fiber Interface Card

Figure 4C:
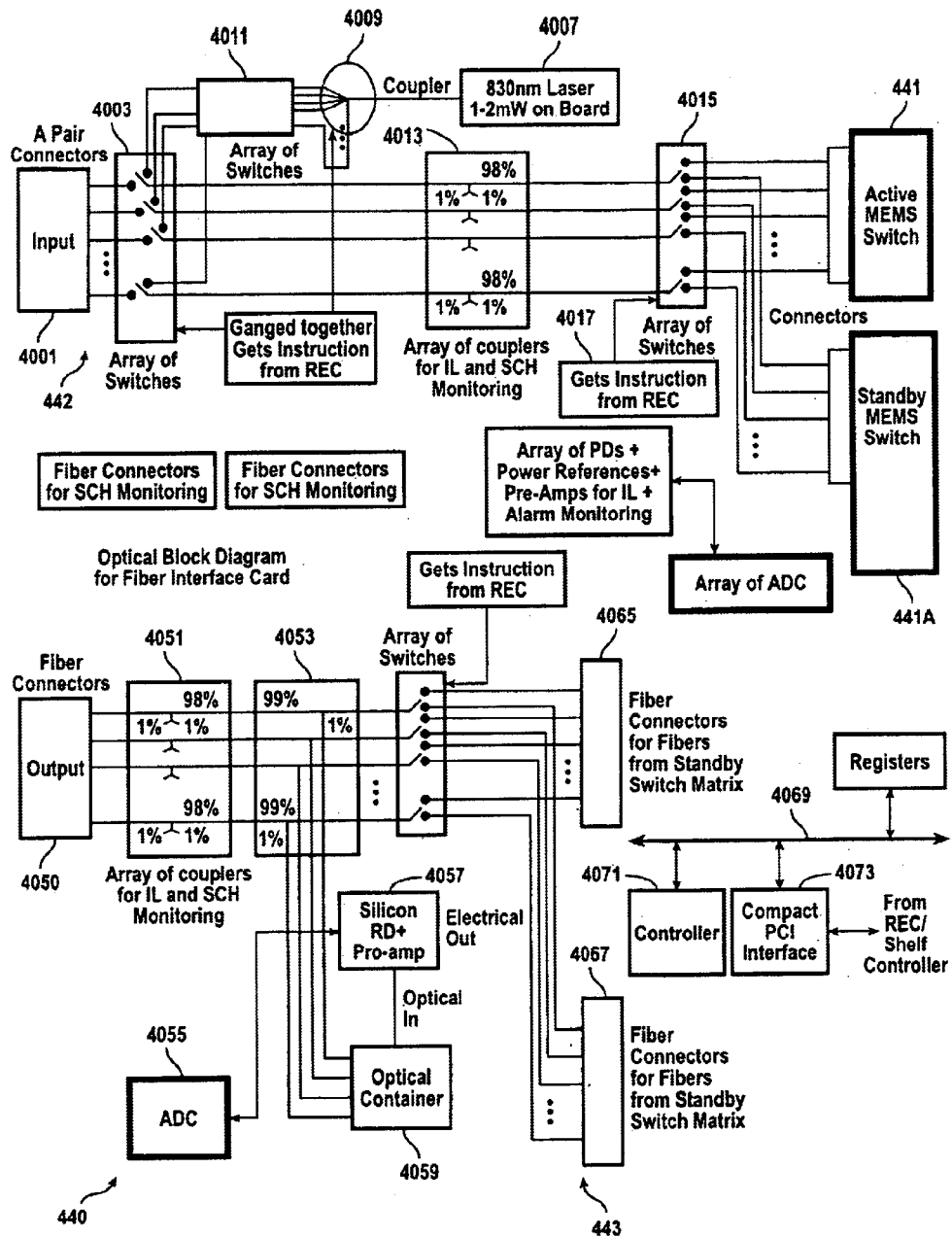

Referring to FIG. 4C, a fiber interface card 440 is illustrated. The fiber interface card terminates fibers. In a specific embodiment, a plurality of fibers (e.g., forty-eight fibers) can be terminated, although there may be more or less. The fibers can be divided equally between input elements 442 and output elements 443. The input fibers 4001 are first sent to an array 4003 of eight two by two (i.e., 2×2) switches. Each of such switches selects an input to the switch matrix between the incoming signal 4001 and a signal from a calibration source 4007. The switch is synchronized with the signal coming from the calibration laser source, which prevents the calibration laser source signal 4007 and the incoming high-speed optical signal from propagating on the same fiber. The calibration source 4007 traverses through coupler 4009, which sends the calibration signal to the array of switches 4011. The FIC also has an electrical control 4071 for the two by two switches. Each of the switches has control, which is registered. The registers are visible to the control processor over a PCI type 4073 of back plane bus 4069.

In a specific embodiment, the calibration laser source is laser (e.g., 830 nm, 780 nm) with a mode harmonizing fiber, which harmonizes all the modes within the fiber. Such fiber is spliced with 1×8 coupler 4009. Each of the 8 outputs of the coupler transfers to a one by one (i.e., 2×2) on-off fiber-optic switch. Such two by two switch prevents one data beam spilling on to the other and cause cross-talk during calibration. The fiber carrying the signal then couples to a special coupler 4013 which splits the incoming signal into three parts with a predetermined ratio, e.g., 98:1:1, 95:2½: 2:2½. The two 1% legs transfer to an optical monitoring process and to the InGaAs photodiode+Amplifier array for "insertion loss" and "loss of signal" monitoring. The photodiode and amplifier convert the optical signal into an analog signal, which converts to digital using a digital to analog converter. The digital signal can be used with an alarm, which can also be a digital TTL type output from the InGaAs photodiode. The SOH optical monitoring is connected into a pair of 8 fiber connectors, where a signal may be taken from the FIC to a separate card for Optical SOH monitoring.

The FIC also selects between an active and standby switch matrix. Here, the signal is derived from the FIC to a switch, which selects between an active and standby switch matrix. This switch is in an integrated package of 8 switches. The fiber coming out of the common switch port is taken to two separate pairs 4065, 4067 of 8 fiber connectors. While one pair is for the active switch matrix 441, the other is for the standby 441A. On the outgoing fiber side, fibers are received from the active and standby switch matrices and then input into an array of 8 two by two switches 4061. The common fiber is then spliced with a 99:1 coupler 4053. This coupler is arranged in an array of 8 or other size, e.g., 24. The outputs go to a combiner 4059 and then to a silicon photodiode 4057. The 99% split is then sent to a coupler, which splits the signal three ways (e.g., 98:1:1, 95:2½: 2:2112). One of the 1% splits goes to the InGaAs PD, which monitors "Insertion Loss" and "Loss of Signal" via output 4055. The other 1% split goes to the pair of 8 fiber connectors and then on to the SOH monitoring card. The 98% split 4051 is sent to the outside world 4050. This 2×2 will switch the optical transport between the backup switch matrix and the active switch matrix card. The card will have some electronics circuitry to drive the 2×2 switch and the fiber interface chips. Fiber redundancy is achieved by simply changing the cross connect configuration.

The fiber termination card taps individual fiber lines and extracts sample signals from each to monitor optical signal level and maybe other optical signal integrity signals. The sample signals or tap information is brought out. The back plane supports a limited number of fiber tap lines. The line card has special circuitry to select a smaller number of tap signals that will be placed into the back plane bus.

In a specific embodiment, the fiber path through the system can be diagnosable. Fiber termination card is a possible location to host the logic to insert and to detect test patterns. The insertion and detection mechanism on the fiber termination card together with the cross connect reconfiguration can help diagnose the entire optics path within the system. This fiber termination cards will work with the reference wavelength card to fully support performance monitoring requirements of the input optical signals. As shown, the FIC card has components to terminate the input fibers. The components include 2×2 Switches (input), taps for SOH & Power Level (e.g., input to 98%, 1%, 1% output), 2×2 switches (output), a Calibration Source at 830 nm, 2×2 switch (e.g., 0.4 db loss, 2–3 ms), a 1×8 coupler, a pair of 8 Fiber connectors for SOH monitoring, InGaAs (LW) PD's+ Amplifiers+Reference voltage source for in-line power monitoring, an electrical Mux as a possible interface before Analog to Digital Converters and others. The FIC also has components to terminate output fibers. Such components include a Silicon PD with Pre-Amplifier, 1 to 2 couplers 99% and 1%, 1 to 3 taps for SOH & Power level (IL),2×2 standby switches to select incoming signal between active and standby, 8 to 1 coupler, a pair of 8 Fiber connectors for SOH monitoring, four InGaAs (LW) PD's+Amplifiers+ Reference voltage source for in-line power monitoring, an electrical Mux as a possible interface before Analog to Digital Converters, and others. Other elements include two connector pairs (1 for input and 1 for output) each connector has a plurality fibers. The other elements include connector pairs for Active and Standby Switches, and Connector pairs for fibers from Active and Standby switches. These and other elements are described in more detail below.

In a specific embodiment, the FIC has a fiber interface controller. That is, each shelf on the bay has it's own controller for the fibers coming in on it's shelf. The system controller switches each of the fibers on the shelf to main or the standby switching element. The FIC also has low cost+ low frequency array of photo-detectors, e.g., 36. These convert the 1% split-off from the incoming signal to electrical signals, amplify them if necessary, compare them against a known threshold and flag the LOL signal if appropriate. Also the card will digitize the voltage corresponding to the input optical power and pass it along over the data bus to a system controller such as a switch matrix controller, e.g., shelf control card 331. The system controller can extract the optical power info through the set algorithm from the digitized signal. The FIC also has on it a special optical module which takes an array of X fibers (X≦48) and using a two different taps converts an incoming light signal into three output signals of power level, e.g., 98%, 1% and 1% or 95%, 21/2%, 21/2%.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Optical Switch Matrix

Figure 4D:
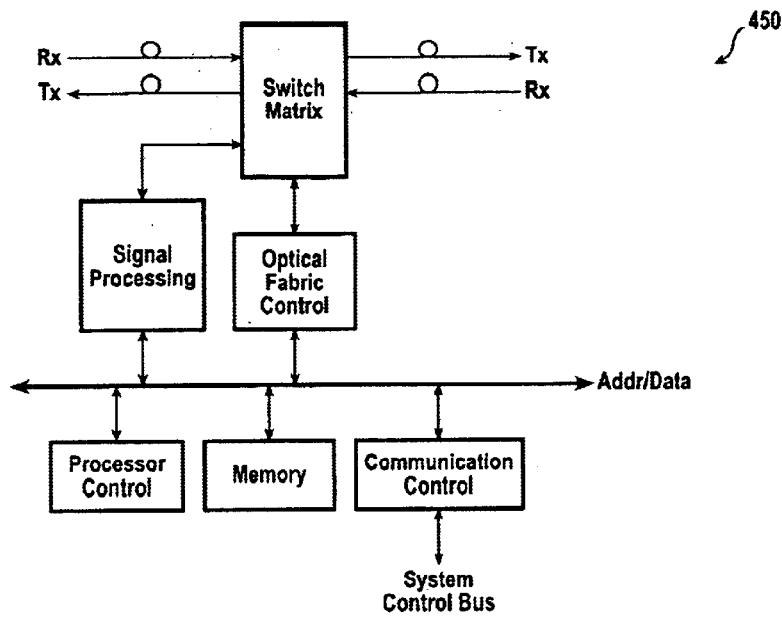

Referring to FIG. 4D, the system has an optical switch matrix that contains the switching fabric, digital control, analog control, and calibration circuitry to support the function of the switch. This module is a self-contained unit that is under the control of the REC to perform switching functions between optical input and output ports. The switch matrix digital control supports communication control from the REC, control of analog interfaces, calibration functions, and monitoring of the switch integrity. The electronic circuitry is visible to the control processor card, perhaps, through a PCI type of back plane bus. A redundant switch matrix slot is provided to support field replacement. Electrical lines in the back plane indicate to the fiber interface cards the current active fabric card. Switchover is coordinated responsibility with the fiber interface cards. Switch matrix diagnostics support isolating failures in the switching cells in a destructive manner. Self-test modes allow the entire switch fabric to be substantially free from defects. This may require external equipment to fully test data paths.

In a specific embodiment, the switch includes a switch fabric control to operate, monitor, and control each of the mirrors. The control uses analog control signals to control each of the mirrors. In a specific embodiment, the matrix includes 513 mirrors in each 256×256 switch. Each mirror has at least 2 axis controls, which relate to 1024 control signals. Some of the mirrors may share a single analog control line or bus, which may be bi-directional so it can be written to and read from. Such bi-directional bus allows for a determination of mirror position. Each of the control signals is addressed and selectable. Each mirror has a read/write (R/W) select for the analog control signal. Other features include digital to analog (DA) and analog to digital (AD) converters. An auto-sense and auto-correct feedback control circuitry corrects for any wobble or oscillation in the mirrors. Switch matrix diagnostics support isolating failures in the switching cells in a destructive manner. These and other features are included in the mirror matrix design.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Packet Extraction Card

Figure 4E:
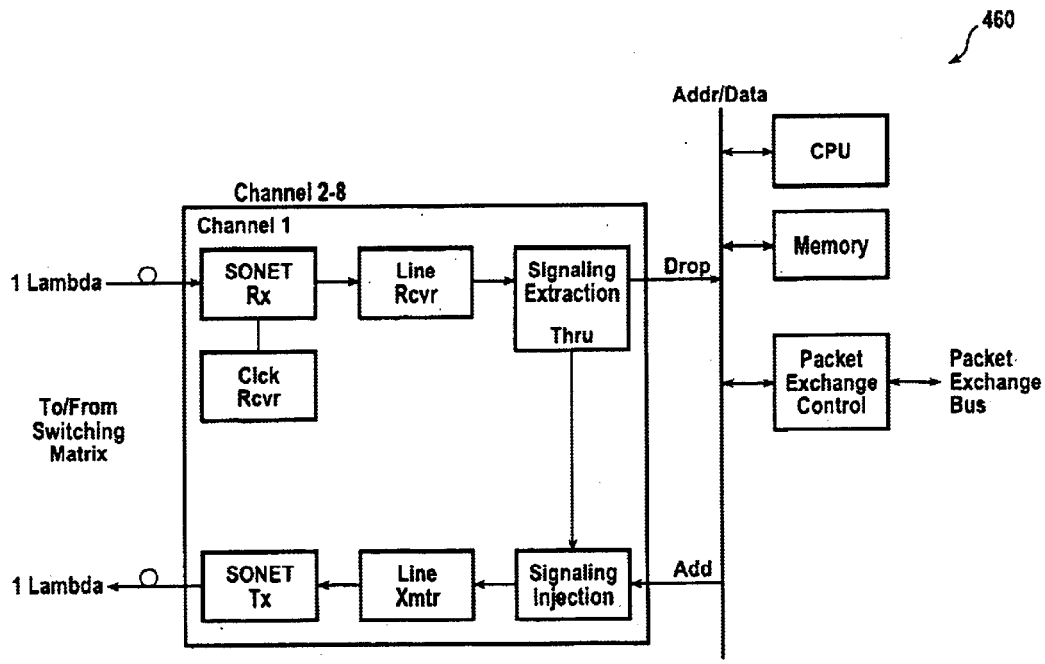

Referring to FIG. 4E, a packet extraction card 460 is illustrated. In a specific embodiment, optical signals from a selected number of fiber interfaces may be carried to the Packet Extraction Card (PEC). The Packet Extraction Card terminates signals directly from the switch matrix. The Packet Extraction Card extracts the SONET DCC channel from the optical stream. This card supports OC-192 and OC-48 and others. Support for higher speed interfaces such as OC-768 is also included. The extracted DCC payload is diverted to the Routing Engine Card as IP packets over the Packet Exchange. It is assumed that the wavelengths are carrying POS payload on the control streams. A signal extraction card may have more intelligence than the fiber interface cards and can have a small capacity general purpose CPU. A role of such a CPU may be to perform packet extractions and injection and to avoid terminating multiple SONET streams at the control processor. The main circuitry of the PEC supports the termination of the SONET signals, clock recovery, and extraction of the DCC channel. A control processor builds messages to and from the Routing Engine Card.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Performance Monitoring Card

Figure 4F:
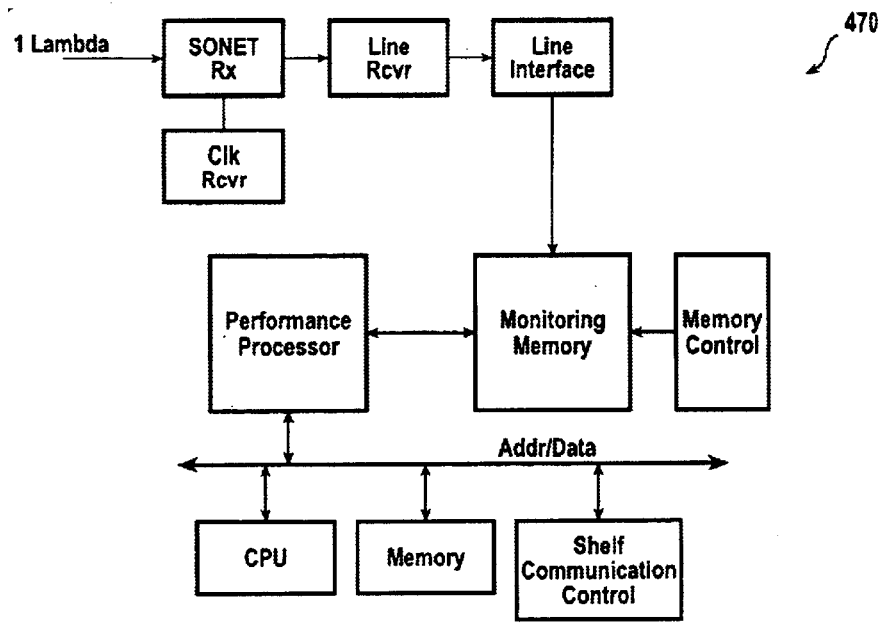

Referring to FIG. 4F, a performance monitoring card 470 is illustrated. In a specific embodiment, performance monitoring of the optical signals is accomplished though using distributed and centralized circuitry. Each of the fiber termination cards supports checking signal levels through an optical line module. Centralized testing is supported on the tapped signals from the fiber interface cards. This is a central resource card that support dynamic checking of all 4096 fibers. An array of detectors for monitoring purposes from the Optical IC for terminations DC optical power measurement purposes are included.

In a specific embodiment, methods according to an embodiment of the present invention may be outlined as follows.

a) Estimated BER. The PMC measures bit error rate (BER) on an on-going shared basis. The PMC is coupled with the optical signal to noise ratio (OSNR) and power measurement at the ingress and egress of the optical signal from the switch.

b) Optical SNR. The PMC measures signal to noise ratio (SNR) data on the system on an on-going shared basis using selected circuits, which are commercially available. As merely an example, equipment manufacturers like Tektronix or Agilent manufacture such circuits. Q-factor for the laser can be extracted from this data.

c) Electrical SNR. The PMC measures electrical SNR on the signaling channel. Preferably, it is only for the signaling channel.

d) Chromatic Dispersion. Chromatic dispersion will be measured. It is not required to measure this on an on-going basis but can be measured on an on-going basis.

e) Polarization Mode Dispersion. Polarization Mode dispersion will be measured. It is not required to measure this on an on-going basis but can be measured on an on-going basis.

f) Wavelength registration. The present system should not be wavelength sensitive in preferred embodiments and there for wavelength registration may not be measured.

g) Wavelength Drift. The present system should not be wavelength sensitive. Accordingly, drift will not be monitored in some embodiments.

h) Cross talk. The present system will measure switch cross talk. Wavelength cross talk may or may not be measured. Switch cross talk is measured by comparing input vs. output OSNR+optical power level comparison.

i) Optical Power transients. Optical power transients will be monitored. Such transients occur due to laser operation. Fluctuation in power, if any, at the output ports will be monitored. Such fluctuations can be due to a variety of reasons, such as, but not limited to wobbling of the mirrors. Such power fluctuations will be compared against the input power.

j) Insertion loss. This will be measured on a constant basis.

k) Jitter. Jitter will be measured during troubleshooting of the system using an oscilloscope coupled to the system.

l) Optical Power Level. This is measured on a constant basis or variable basis.

m) Bit Rate: This is measured for control channel only, but can also be measured at other points.

In a specific embodiment, the monitoring card also couples to a variety of external measurement tools. Such tools monitor functions such as BER using external equipment, CRC payload, and CRC header, and the like. The card will support short and long-term integrations of test cycles. This allows thresholds to be set for long-term-integration of alarm conditions that require automatic or manual intervention. All alarms and counters will be available to the element manager. The Performance monitoring card is configured and monitored via the Shelf Control Bus.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Alarm Clock Card

Figure 4G:
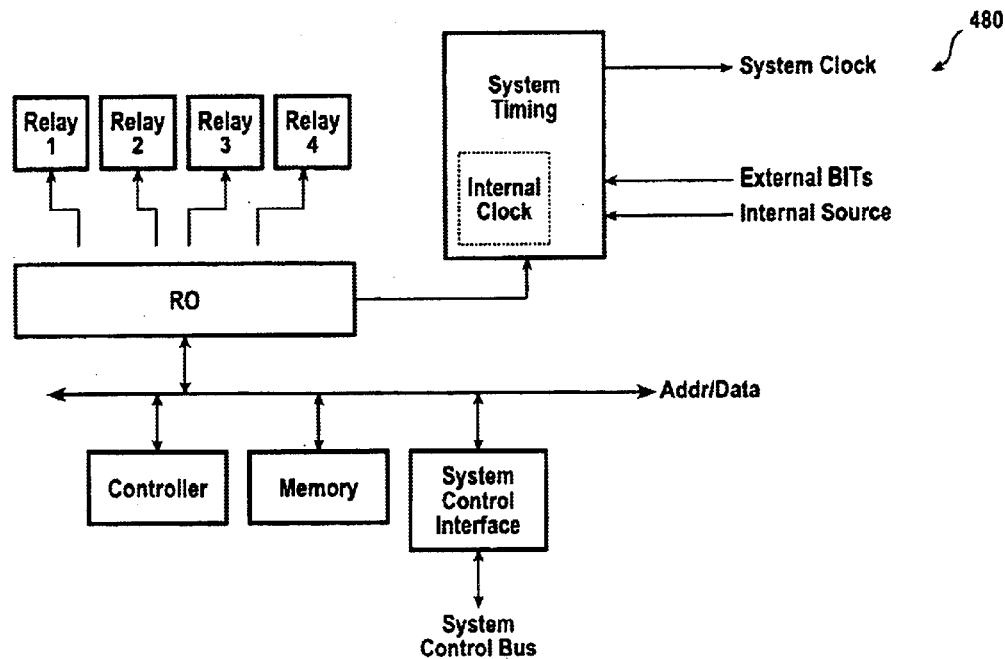

Referring to FIG. 4G, an alarm control card 480 is illustrated. The card includes various circuitry used to communicate to the central office the standard alarm indicators and provide system timing. The card is primarily composed of switches, relays, and PLL clocking circuit. The card conforms to Bellcore standards, as desirable. This card contains a general controller that will process commands that indicate whether to set or release relays indicating alarm conditions and clearing of alarm conditions. The system timing requirements will be based on extracting clocking from external inputs, or BITs clock, or internal timing sources. Internal sources will be through from terminated SONET signals. The timing circuitry will phase-lock to the input provided for synchronously running the system to a Stratum 3 clock source.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Power System and Control

Figure 4H:
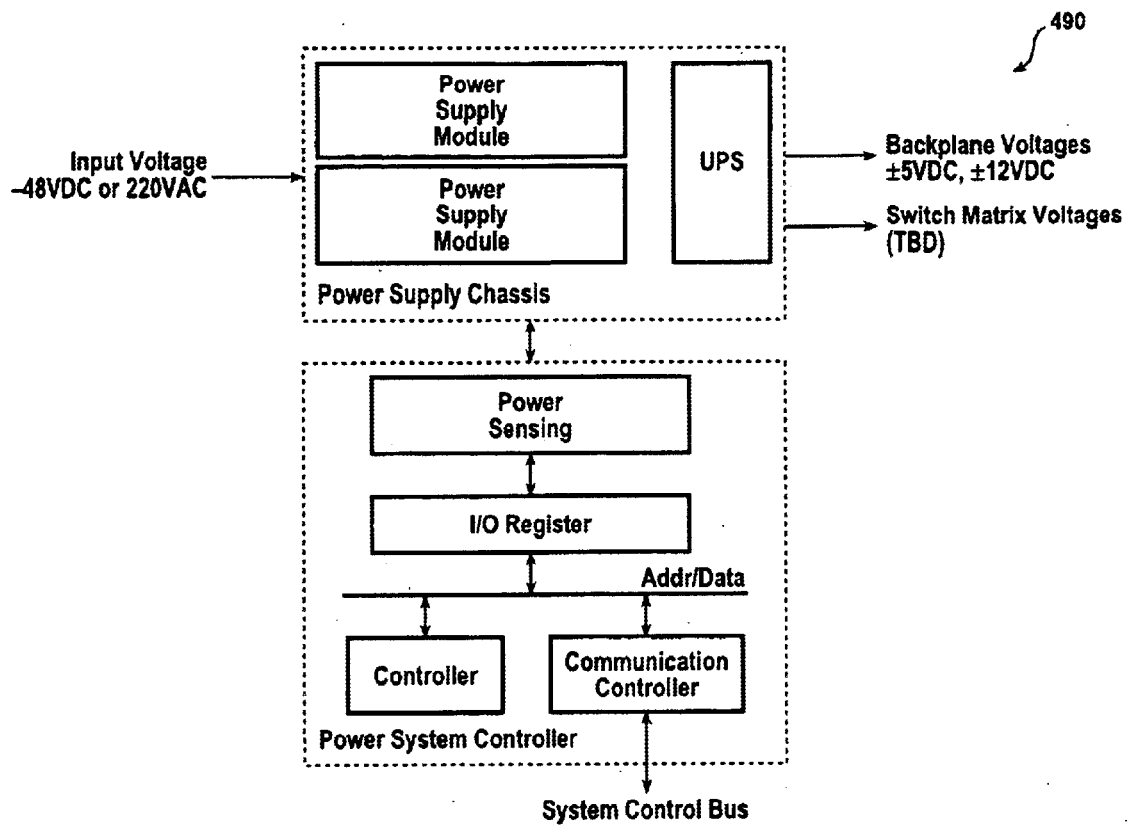

Referring to FIG. 4H, a power system 490 is illustrated. The power system for the switch system is a redundant design to insure high-availability. The power systems are designed for −48 VDC and 220 VAC input voltages. Components of the power system include a (1) power supply controller, (2) power supply modules, and (3) the power chassis. One power system is used per bay but can also include more than one power supply. Power consumption at each node should not exceed 1000W maximum. Power control and redundancy are managed on a per bay basis. Control circuitry support communication paths to the system controller (REC), load sharing, input voltage monitoring, and failure reporting. The communication path to the system controller is done through the system control bus. The cards will contain sensing circuitry for the input power to detect brown-out conditions. The power system provides +5 VDC, −5 VDC, +12 VDC, −12 VDC to the electrical back plane. Special voltage inputs to support the switch matrix may be required. The power system for the switch matrix card may also include an uninterrupted power supply (UPS) to keep power applied to the switch matrix system to support power failure conditions.

The present system also includes an electrical back plane. The back plane supports the power to the cards, system control bus, shelf control buses, and the packet exchange bus. A desire is to have shelf busses be designed the same for the fiber interface shelves. These buses will also provide grounded pins for card slot recognition to support addressing each card. There will be at least two different back planes to support the fiber interface shelves and the controller shelf. The shelf control bus and the packet exchange bus will be based on the compact PCI architecture. This architecture supports hot swap capability, which is required for the system. The back planes support redundant buses to reduce single points of failure.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

A method according to an embodiment of the present invention can be described as follows.

1. Input data beam through first path through switch 1;
2. Tap a portion of the data beam for monitoring at input;
3. Sense portion of data beam at input;
4. Tap a portion of the data beam for monitoring at output;
5. Determine if data beam is acceptable based upon one or both taps;
6. If not, perform switch over of data beam to alternative mirrors on second path of switch 1 or switch 2;
7. Perform diagnostic on switch 1;
8. Input position beam through second path (continuous or as needed);
9. Maintain or adjust mirror positions based upon position beam while performing detection on position beam;
10. Switch data beam from first path to second path;
11. Switch position beam from second path to first path;
12. Monitor data beam at input through tap;
13. Monitor data beam at output through output tap;
14. Perform other steps, as desired.

The above sequence of steps is

Figure 5:
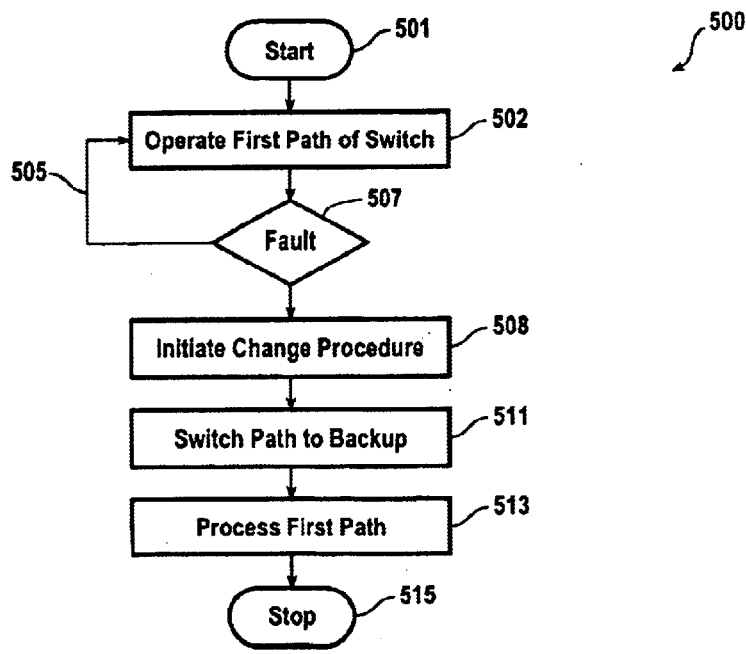
FIG. 5 is a simplified flow diagram of a method according to an embodiment of the present invention.

FIG. 5 is a simplified flow diagram 500 of a method according to an embodiment of the present invention. This diagram is merely an example, which should not unduly limit the scope of the claims herein. One of ordinary skill in the art would recognize many other variations, modifications, and alternatives. As shown, the method begins at start, step 501. The method inputs a data beam through a first path through switch 1. The first path often includes receiving the data beam from an input device, traversing the beam through a lens, reflecting the beam from a first mirror device to a second mirror device, which sends the beam to an output device. Before entering the input device or at the input device, a portion of the beam is tapped for monitoring. Often times, the beam is monitored at, for example, the fiber interface card or the like. The tapped portion is sensed.

As noted, the beam traverses through the first mirror and the second mirror to the output device. At such device, a portion of the data beam is also tapped for monitoring. Next, the method determines if there is a fault through the first path, step 507. Here, the method determines if data beam is acceptable based upon one or both taps. In a specific embodiment, the taps are provided at the fiber interface card or the like, which provides signals to a controller device. If the data beam is acceptable, the method continues to step 502. Alternatively if the data beam is not acceptable, the method performs a switch over of the data beam to alternative mirrors on a second path of switch 1 or switch 2, step 508. In a specific embodiment, the method performs a diagnostic on switch 1 using one or more diagnostic programs.

The method goes through a procedure to switch (step 511) the position beam and the data beam from their respective paths. Here, the mirror positions based upon the position beam is maintained while performing detection of beam position. Next, the data beam is switched from the first path to the second path. The position beam is switched from the second path to the first path. The data beam is then monitored. The data beam is monitored at the input through a tap. The data beam is also monitored at the output at a tap. A controller monitors the data beam at the input and output taps. Depending upon the embodiment, the method also includes other steps, which can be included in any of the above steps or in addition to any of the above steps. As merely an example, the method performs a maintenance process (step 513) on the first path, while the second path is being used. The method stops at step 515.

Although the above has been described in terms of a specific sequence of steps, it would be recognized that there could be many alternatives, variations, and modifications. For example, any of the above elements can be separated or combined or combined with other elements. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Figure 6:
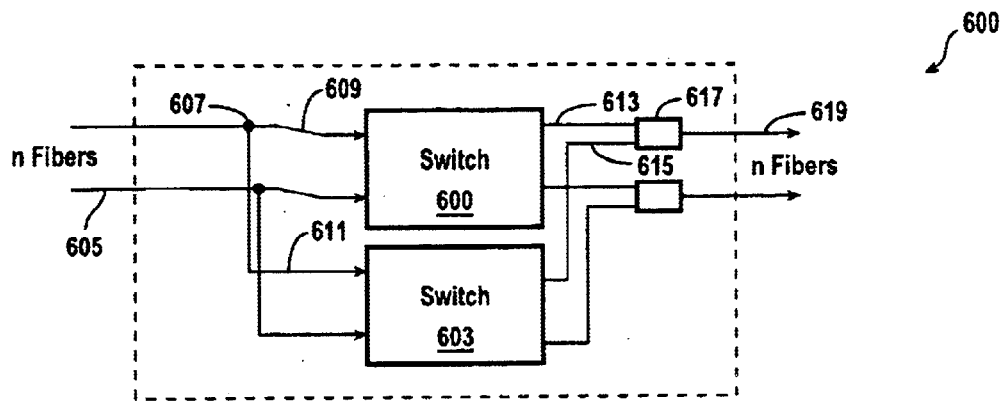
FIGS. 6, 7, and 8 are detailed diagrams of redundant switch systems of the above FIG. according to embodiments of the present invention
Figure 8:
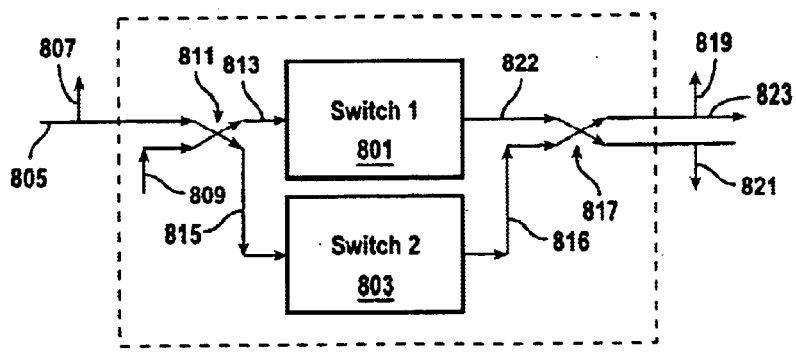

FIGS. 6 and 8 are detailed diagrams of redundant switch systems of the above Fig. according to embodiments of the present invention. These diagrams are merely examples, which should not unduly limit the scope of the claims herein. One of ordinary skill in the art would recognize many other variations, modifications, and alternatives. As shown, the system 600 includes a first switch 601 and second switch 603. Each of the switches is a switch fabric, preferably packaged separately. Input data signals 605 enter into one of the fiber paths. One such signal is split 607 using a coupler into a first path 609 and a redundant path 611, which can also be the other way around. The signal from either the first path or the second path continues via branch 613 or branch 615 to a two by one switch 617. Depending upon which switch is active, the two by one switch directs one of the branches to output 619. The present switch system 600 can employ the method above as well as others.

Figure 7:
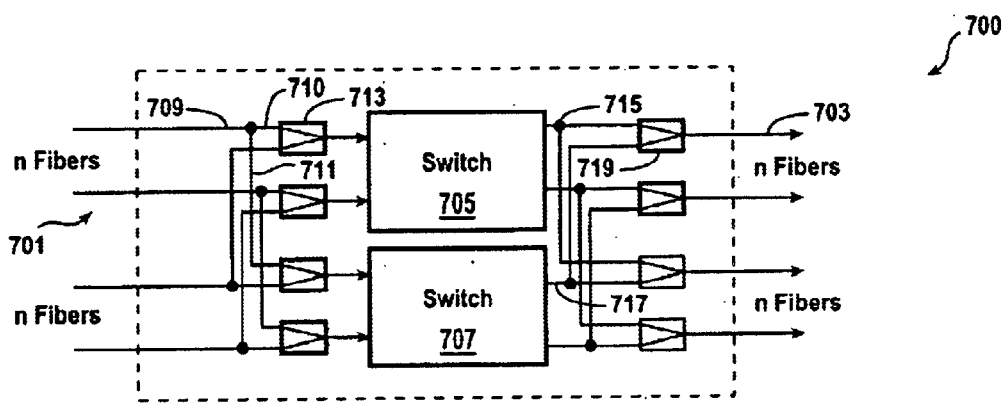

An alternative switch system 700 is also provided, as shown in FIG. 7. The switch system 700 includes a first switch 705 and second switch 707. Each of the switches is a switch fabric, preferably packaged separately. Input data signals 701 enter into one of the "n" fiber paths. One such signal 709 is split using a coupler into a first path 710 and a redundant path 711, which can also be the other way around. Each of the signals goes into a two by one switch, which directs the switch through switch fabric 705 or switch fabric 707. The signal from either the first path or the second path continues via branch 715 or branch 717 into two by one switches 719. Depending upon which switch is active, the two by one switch directs one of the branches to output 703. The present switch system 700 can employ the method above as well as others.

In a preferred embodiment, the invention provides switch system 800 to carry out the method described above. As shown, switch system 800 includes switch 1 801 and switch 2 803, which is redundant or includes redundant paths (which are alternative paths). As merely an example of operation of the system, data beam 805 is input through a first path through switch 1 801. The first path often includes receiving the data beam from an input device, traversing the beam through a lens, reflecting the beam from a first mirror device to a second mirror device, which sends the beam to an output device. Before entering the input device or at the input device, a portion of the beam is tapped 807 for monitoring. Often times, the beam is monitored at, for example, the fiber interface card or the like. The tapped portion is sensed, where the remaining portion of the beam 813 goes to switch 1 801.

As noted, the beam traverses through the first mirror and the second mirror in switch 1 to the output device. At such device, a portion of the data beam is also tapped 819 for monitoring. To monitor, the system determines if data beam is acceptable based upon one or both taps. In a specific embodiment, the taps are provided at the fiber interface card or the like, which provides signals to a controller device. If there is a fault of the data beam through the first path of switch 1, the system initiates a path change procedure. If the data beam is not acceptable, the system performs a switch over of the data beam to alternative mirrors on a second path of switch 1 or switch 2 803 via path 815 and out through the two by two switch 817. In a specific embodiment, the system can perform a diagnostic on switch 1 using one or more diagnostic programs.

As an ongoing matter, the system can monitor the second path while it is not in use. Alternatively, the system performs diagnostics on the second or first path while either one is not being used. Here, a monitoring beam source 809 provides a monitoring beam through the second path 815, through switch 2 803, which can be monitored at output 821. The monitoring beam is detected at sensor 821. Depending upon the embodiment, two by two switches determine which path each beam should follow. For example, data beam 805 enters two by two switch 811, which is configured to send the beam via branch 813 to switch 1 801. Outgoing beam 822 goes through switch 817 through outgoing fiber 823, which is tapped in part 819. Monitoring beam 809 goes through switch 811 and then through path 815 and through switch 2. Outgoing monitoring beam 816, 822 goes through switch 817 and is monitored at sensor 821. In a specific embodiment, the monitoring beam maintains a position of a pair of mirrors in switch 2 while it is not in use. Depending upon the embodiment, there can be many other incoming and outgoing data and monitoring beams.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

The system is merely provided to show an example of a way of implementing the present invention. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical switching system, the system comprising:

a housing;

an input device coupled to the housing;

an output device coupled to the housing;

a first switch fabric coupled between the input device and coupled between the output device, the first switch fabric comprising a plurality of MEMS based switching devices, one or more of the MEMS based switching device being capable of deflecting optical signals;

a second switch fabric coupled between the input device and coupled between the output device, the second switch fabric comprising a plurality of MEMS based switching devices, one or more of the MEMS based switching device being capable of deflecting optical signals;

an input fiber bundle coupled to the input device;

an output fiber bundle coupled to the output device;

a first switching device coupled to the first switch fabric and coupled to the second switch fabric, the first switching device also being coupled to the input device for receiving a beam from one of the input fibers and directing the beam to the first switch fabric or the second switch fabric depending upon a predetermined criteria;

a second switch device coupled to the first switch fabric and coupled to the second switch fabric, the second switching device also being coupled to the output device for receiving the beam from either the first switch fabric or the second switch fabric depending upon the predetermined criteria; and a control device coupled to the first switch device and the second switch device, the control device providing a signal to determine if the beam is to be directed to the first switch fabric or the second switch fabric based upon the predetermined criteria.

2. The system of claim 1 wherein each of the MEMS based switching devices is capable of directing an optical signal from the input fiber bundle to the output fiber bundle.

3. The system of claim 1 wherein the first switch fabric is a primary switch fabric and the second switch fabric is a backup switch fabric.

4. The system of claim 1 wherein the first switching device is provided on a fiber interface card.

5. The system of claim 1 wherein the second switching device is provided on a fiber interface card.

6. The system of claim 1 further comprising a position beam source coupled to the first switching device.

7. The system of claim 6 further comprising a sensor device coupled to the second switching device.

8. The system of claim 1 wherein the first switching device is a two by two switch.

9. The system of claim 1 wherein the second switching device is a two by two switch.

10. The system of claim 1 further comprising a position beam source coupled to the first switching device and a sensor device coupled to the second switching device, the second switching device being adapted to receive a position beam from the position beam source.

11. A method of operating an optical switching system, the method comprising:
- tapping a first portion of an incoming data beam from an incoming source;
- transferring the incoming data beam from the incoming source to a first path provided by a first MEMS based switching fabric;
- transferring a monitoring source to monitor a second path of provided by second MEMS based switch fabric, while the second path of the second MEMS based switch fabric is in a stand by mode;
- tapping a second portion of an outgoing data beam provided by the first MEMS based switching fabric; and
- determining a process condition of the first path by at least the second portion of the outgoing data beam.

12. The method of claim 11 wherein the determining is provided by the first portion of the incoming data beam.

13. The method of claim 11 wherein the incoming data beam and the outgoing data beam are continuous.

14. The method of claim 11 wherein the second MEMS based switch fabric is redundant.

15. The method of claim 11 wherein the incoming data beam and the monitoring beam can be switch to traverse through either the first path or the second path.

* * * * *